United States Patent
Blohowiak et al.

(10) Patent No.: US 10,894,398 B2
(45) Date of Patent: Jan. 19, 2021

(54) CRYOGENIC-ASSISTED ADHESIVE REMOVAL TOOL

(71) Applicant: The Boeing Company, Chicago, IL (US)

(72) Inventors: Denise Alexandra Blohowiak, Issaquah, WA (US); Kay Youngdahl Blohowiak, Issaquah, WA (US); Kenneth Allen Kruger, Bonney Lake, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/389,191

(22) Filed: Apr. 19, 2019

(65) Prior Publication Data
US 2020/0331253 A1    Oct. 22, 2020

(51) Int. Cl.
*B32B 43/00*    (2006.01)
*B32B 38/10*    (2006.01)

(52) U.S. Cl.
CPC ............ *B32B 43/006* (2013.01); *B32B 38/10* (2013.01); *Y10T 156/1153* (2015.01); *Y10T 156/1184* (2015.01); *Y10T 156/1911* (2015.01); *Y10T 156/1967* (2015.01)

(58) Field of Classification Search
CPC . B32B 38/10; B32B 43/006; Y10T 156/1153; Y10T 156/1184; Y10T 156/1911; Y10T 156/1967
See application file for complete search history.

(56) References Cited

U.S. PATENT DOCUMENTS

| | | | | |
|---|---|---|---|---|
| 3,934,379 A | * | 1/1976 | Braton | B24C 1/00 451/38 |
| 4,554,025 A | * | 11/1985 | Burke | B08B 7/0092 118/70 |
| 5,044,129 A | * | 9/1991 | Olevitch | B24C 1/003 451/40 |
| 6,925,730 B2 | * | 8/2005 | Arpke | B44D 3/16 34/229 |
| 9,352,509 B1 | | 5/2016 | Kesterson | |

(Continued)

FOREIGN PATENT DOCUMENTS

| | | |
|---|---|---|
| DE | 19500410 A1 | 7/1996 |
| EP | 0241749 A1 | 10/1987 |
| EP | 0529363 A1 | 3/1993 |

OTHER PUBLICATIONS

M SR Rotary Cutter & SR Radial Bristle Discs; 3M 2002 61-5002-8020-3 (MCS 212053).

(Continued)

*Primary Examiner* — Mark A Osele
*Assistant Examiner* — Nickolas R Harm
(74) *Attorney, Agent, or Firm* — Duft & Bornsen, PC (57) ABSTRACT

Systems and methods are provided for removing adhesive features. One embodiment is a method for operating a cryogenic-assisted adhesive a removal tool. The method includes dispensing a cryogenic fluid onto an adhesive feature disposed at a surface of a structure, cooling the adhesive feature to cause a physical change making the adhesive feature brittle, and operating the cryogenic-assisted adhesive removal tool to cleave the adhesive feature from the surface while the adhesive feature is physically changed.

20 Claims, 9 Drawing Sheets

(56) References Cited

U.S. PATENT DOCUMENTS

| | | | |
|---|---|---|---|
| 2011/0319309 A1* | 12/2011 | Seddon | C11D 3/28 |
| | | | 510/200 |
| 2013/0048224 A1* | 2/2013 | George | H01L 21/67282 |
| | | | 156/752 |
| 2017/0259306 A1 | 9/2017 | Wiseman et al. | |
| 2019/0061073 A1* | 2/2019 | Bogue | B23P 11/025 |
| 2019/0210351 A1* | 7/2019 | Bae | B32B 43/006 |

OTHER PUBLICATIONS

PROS Mastic removal system; Kell-Strom Tool Co. Mastic removal system in Hand Tools; https://www.aviationpros.com.

Terra Universal Critical Environment Solutions; https://www.terrauniversal.com/cleaning-systems/cleaners-sno-gun-ii.php; Mar. 5, 2019.

European Search Report; Application EP20164506; dated Sep. 14, 2020.

Kryogen (Technik) Wikipedia; Aug. 14, 2019. Online at https://de.wikipedia.org/wiki/Kryogen_(Technik).

\* cited by examiner

CRYOGENIC-ASSISTED ADHESIVE REMOVAL TOOL

FIELD

The disclosure relates to the field of fabrication and repair, and in particular, to removal of material from fabricated parts.

BACKGROUND

Adhesive features (e.g., sealants, adhesives, decals, appliqués and other features having flexible or elastomeric properties) are applied to a variety of locations on an aircraft to prevent fuel leakage, provide erosion resistance, grant aeronautical benefits, grant specific optical and performance properties, and protect the aircraft from corrosion and other effects of environmental exposure. Adhesive features are adhered to the surface of an aircraft via chemical means, and have a limited lifetime. The adhesive features can also protect and assist other components on the aircraft which themselves have limited lifetimes. Removal of these other components may necessitate removal of their corresponding adhesive feature. Removal of adhesive features is difficult because their elastomeric properties tend to cause them to deform rather than be cleaved or otherwise separated from the surface on which they are installed. Furthermore, the elastomeric properties of adhesive features may result in a gumming up of the cleaving or separating edge of the removal tool and/or the underlying surface, because the material being removed tends to stick to everything that it contacts.

Removal of adhesive features remains difficult due to the tenacious nature of the materials that they are made from. These materials tend to be elastomeric and tightly adhered to the surface. When used properly, tools designed for removal of adhesive features allow for a labor-intensive mechanical removal process. However, there is the potential that tools designed for removal of adhesive features will be used improperly, for example due to operator fatigue or impatience. When used improperly, the tools can be damaged, can mark the surface of the aircraft, or can remove less or more than desired amounts of the adhesive feature from the aircraft surface.

Therefore, it would be desirable to have a method and apparatus that take into account at least some of the issues discussed above, as well as other possible issues.

SUMMARY

Embodiments described herein include removal tools that apply cryogenic gases to provide localized cooling which reduces the temperature of adhesive features applied to a surface. This makes the adhesive features brittle and easier to mechanically remove (e.g., scrape). The removal tools also include cleaving/scraping edges or tips that facilitate mechanical-based removal of adhesive features, while maintaining integrity of the surface. One embodiment is a method for operating a cryogenic-assisted adhesive a removal tool. The method includes dispensing a cryogenic fluid onto an adhesive feature disposed at a surface of a structure, cooling the adhesive feature to cause a physical change making the adhesive feature brittle, and operating the cryogenic-assisted adhesive removal tool to cleave the adhesive feature from the surface while the adhesive feature is physically changed.

A further embodiment is an apparatus for performing cryogenic cleaving. The apparatus includes a barrel that includes a dispensing pathway for cryogenic fluid to travel, a tip coupled with the barrel that provides a port for the cryogenic fluid to exit the dispensing pathway, and that includes a cleaving surface, and a trigger that controllably activates dispensing of the cryogenic fluid via the dispensing pathway.

A further embodiment is a system for performing cryogenic cleaving. The system includes a cryogenic fluid reservoir, and a cryogenic-assisted adhesive removal tool that is coupled with the cryogenic fluid reservoir and that dispenses cryogenic fluid stored within the cryogenic fluid reservoir from a cleaving tip of the cryogenic-assisted adhesive removal tool.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
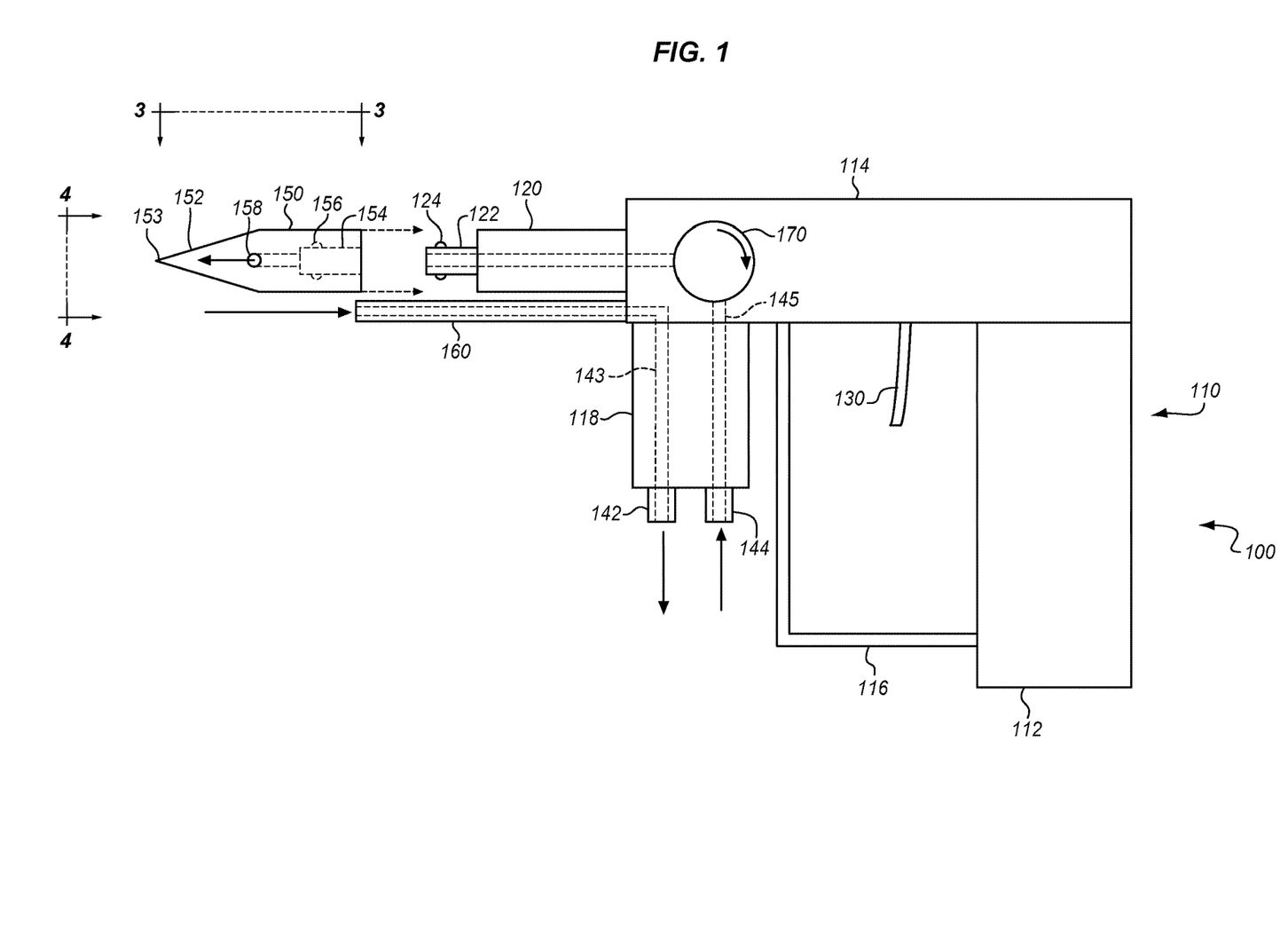
FIG. 1 illustrates a cryogenic-assisted adhesive removal tool in an illustrative embodiment.

FIG. 1 illustrates a cryogenic-assisted adhesive removal tool 100 in an illustrative embodiment. Cryogenic-assisted adhesive removal tool 100 comprises any system, device, or component operable to dispense a cryogenic fluid (e.g., a gas or liquid that is colder than ambient temperature) to an adhesive feature that has been applied atop a surface of a structure (e.g., a portion of an aircraft). Cryogenic-assisted adhesive removal tool 100 is also able to perform cleaving of the surface to remove the adhesive feature while the adhesive feature is cooled to a degree that it exhibits a physical change (e.g., is cooled below a glass transition temperature, such as a glass transition temperature of a chemical sealant that secures the adhesive feature in place).

Cryogenic-assisted adhesive removal tool 100 provides a technical benefit over prior scraping tools because it provides cooling that cause a physical change resulting in increased brittleness within a material used in the adhesive feature. This results in the adhesive feature becoming brittle, which enhances the ease with which the feature is removed via cleaving. Hence, less force is needed to separate the adhesive features from the surface, which reduces the likelihood of an operator applying amounts of force that are undesirable. In other words, less applied force is needed, which reduces likelihood of an operator applied applying an amount of force that would undesirably mark the underlying surface.

In this embodiment, cryogenic-assisted adhesive removal tool 100 comprises handle 112 and body 114, which together with trigger guard 116 and housing 118 define the overarching structure and shape of cryogenic-assisted adhesive removal tool 100. These components may be shaped according to any desired ergonomic constraints, and may be made from metal, plastic, ceramics, etc. In further embodiments, these components are made from materials that retain their strength when exposed to the cryogenic fluid. In further embodiments, these components are coated with rubber or a rubberized compound to increase grip.

Housing 118 structurally supports a coupling 142, which leads to a dispensing pathway 145, and also structurally supports a coupling 144, which leads to a vacuum pathway 143. Housing 118 may further provide thermal insulation in order to prevent convective or conductive cooling of an operator's hand during operation.

When operations are initiated by the pulling of trigger 130, the dispensing pathway 145 dispenses the cryogenic fluid from a reservoir outward through barrel 120 and protrusion 122 of the tool. Meanwhile, vacuum pathway 143 may apply negative pressure/vacuum that extracts/draws applied cryogenic fluid away from an application area (e.g., a surface of an aircraft) via vacuum inlet 160. This prevents the amount/concentration of cryogenic fluid outside of the tool from increasing beyond a desired amount, which may ensure air quality and/or a desired range of temperatures near an operator. Pressure at which the cryogenic fluid is dispensed may be controlled via pressure regulator 170, which may comprise a manual valve controlled by a knob. In further embodiments, pressure regulator 170 may be implemented as or controlled by, for example, custom circuitry, a hardware processor executing programmed instructions, or some combination thereof that implements feedback-based pressure and/or flow control.

Cryogenic-assisted adhesive removal tool 100 is designed to enable the use of interchangeable cleaving tips. Thus, protrusion 122 includes mating features 124 (e.g., spring-loaded ball bearings, mating pins, cams, etc.). When a new interchangeable tip, such as tip 150, is attached, protrusion 122 slides within cavity 154 until mating features 124 engage with mating features 156 (e.g., cut-outs, notches, or spring-loaded detents) to form a removable connection. Tip 150 operates as an extended pathway via which the cryogenic fluid travels, and includes one or more ports 158 (e.g., openings, nozzles, diffusers, etc.) for dispensing the cryogenic fluid proximate to a location where scraping/cleaving will commence. This makes elastomeric materials within the adhesive feature brittle before they are cleaved off. Tip 150 further comprises a cleaving surface 152 and an edge 153 for physically cleaving a desired location. Cleaving surface 152 may be static, may be driven at a high level of rotary speed, or may even rapidly oscillate (e.g., back and forth, side-to-side, etc.) to facilitate removal of adhesive features.

Tip 150 may be made from any suitable material, and may for example be made from materials which, in the desired range of operating temperatures have sufficient stiffness and strength that will allow for efficient removal of the adhesive feature, yet soft enough that they will not scratch or gouge the underlying surface upon which the adhesive features reside. For example, tip 150 may be made from nylon, polyamide-imide, polyether-imide, phenolic, acrylic, fluoropolymers, and other engineered polymers. This reduces the likelihood of tip 150 scratching the surface during operation. In further embodiments, polymeric tips may be selected which do not become brittle when cooled to the operating range of cryogenic-assisted adhesive removal tool 100, and that have high wear resistance, impact resistance, fatigue resistance, and mechanical strength. Additionally, the polymeric tips may be selected such that any change in hardness of the tip (caused by cooling the tip to the cryogenic operating range) does not cause marks upon the surface. This ensures that the adhesive is cleaved from the surface without causing any undesired or out of tolerance marking or gouging at the surface.

Illustrative details of the operation of cryogenic-assisted adhesive removal tool 100 will be discussed with regard to FIG. 1. Assume, for this embodiment, that an adhesive feature is chemically secured to a surface of a structure (e.g., a portion of an aircraft) and awaits removal. Further, assume that cryogenic-assisted adhesive removal tool 100 has been coupled with a cryogenic fluid reservoir and a vacuum supply.

Figure 2:
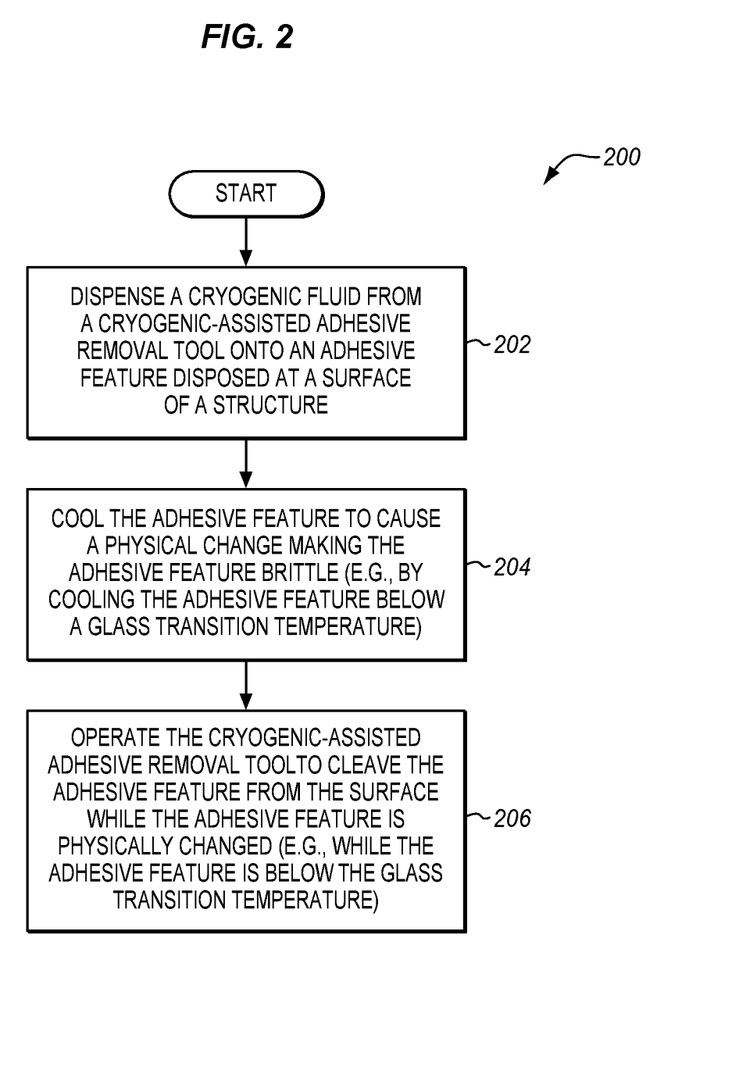
FIG. 2 is a flowchart illustrating a method for operating a cryogenic-assisted adhesive removal tool in an illustrative embodiment.

FIG. 2 is a flowchart illustrating a method for operating a cryogenic-assisted adhesive removal tool in an illustrative embodiment. The steps of method 200 are described with reference to cryogenic-assisted adhesive removal tool 100 of FIG. 1, but those skilled in the art will appreciate that method 200 may be performed with other tools as desired. The steps of the flowcharts described herein are not all inclusive and may include other steps not shown. The steps described herein may also be performed in an alternative order.

An operator of the cryogenic-assisted adhesive removal tool 100 places it close to a portion of the surface that is covered by the adhesive feature, and pulls the trigger 130. This causes a cryogenic fluid to be dispensed from the cryogenic-assisted adhesive removal tool 100 onto the surface of the structure in step 202. The cryogenic fluid may comprise a gas or liquid, and may be selected from among carbon dioxide, nitrogen (which liquefies at negative two hundred and ten degrees Celsius), helium, argon, or others. Carbon dioxide may provide additional benefits beyond cooling, for example by dissolving adhesive compounds and acting as a cleaning solvent.

The cryogenic fluid may be dispensed at a temperature cooler than ambient temperature, such as a temperature below a glass transition temperature of the adhesive feature. For example, the cryogenic fluid may be dispensed at temperatures less than zero degrees Celsius, ranging down to negative one hundred ninety-five degrees Celsius. The pressure and volumetric flow of the cryogenic fluid may be selected as desired based on an expected rate of removal and a thermal mass of the adhesive feature per unit area. In one embodiment, pressures range between one and fifty Pounds per Square Inch (PSI), and volumetric flow rates range between one liter per minute and one liter per second.

In step 204, the cryogenic fluid cools the adhesive feature to cause a physical change making the adhesive feature brittle (e.g., by cooling the adhesive feature below the glass transition temperature of a chemical that secures the adhesive feature in place). The cryogenic fluid may cool the adhesive feature via convective and/or conductive heat transfer. This causes the chemical, and/or the entire adhesive feature, to become brittle. The cryogenic fluid also cools the tip 150 of the cryogenic-assisted adhesive removal tool 100, which ensures that contact between the tip 150 and the adhesive feature does not result in conductive or frictional heating of the adhesive feature above the temperature at which the physical change occurred (e.g., the glass transition temperature). In this manner, the cryogenic fluid ensures that both the tip 150 of the cryogenic tool and the adhesive feature itself remain cool enough that the adhesive feature may be effectively chipped or cleaved away from its underlying surface.

In step 206, the cryogenic-assisted adhesive removal tool 100 is operated to cleave (e.g., mechanically remove) the adhesive feature from the surface while the adhesive feature is physically changed/cooled (e.g., is below its glass transition temperature), to remove the adhesive feature from the structure. For example, an operator of the cryogenic-assisted adhesive removal tool may move the tip 150 back and forth across the adhesive feature while pressing the tip into the surface of the structure. In a further example, the operator may activate a motorized system that drives the tip in order to facilitate cleaving.

Method 200 provides a technical benefit over prior systems, because it provides a removal technique which utilizes cooling to alter the physical properties of material that is being removed. This increases the ease with which the material is removed, for example by causing the material may lose elastomeric properties that would otherwise have made it difficult to cleave. Thus, operators may beneficially remove adhesive features in less time and with less effort than was previously possible and without undesired marks being created on the underlying surface that the adhesive feature resides on.

Figure 3:
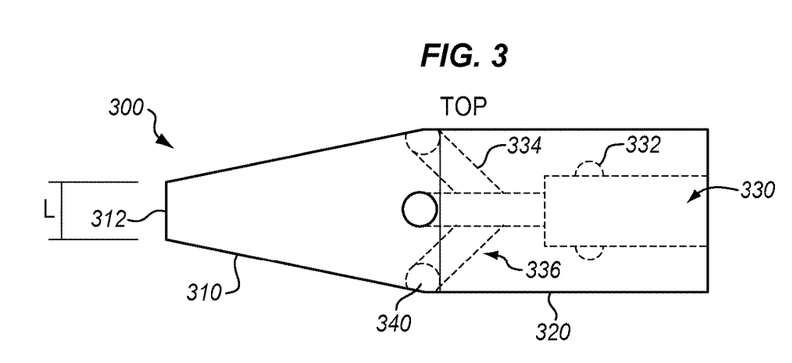
FIGS. 3-4 are views of a first interchangeable tip for a cryogenic-assisted adhesive removal tool in an illustrative embodiment.
Figure 4:
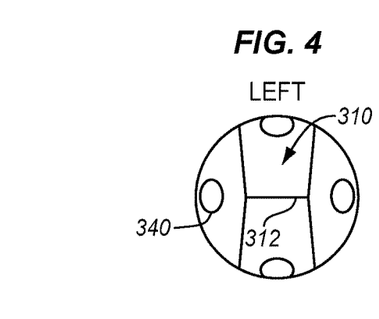

FIGS. 3-4 are views of a first interchangeable tip 300 for a cryogenic-assisted adhesive removal tool in an illustrative embodiment, and correspond with view arrows 3 and 4 of FIG. 1, respectively. In this embodiment, first interchangeable tip 300 includes body 320, from which surface 310 extends, ending in edge 312. A cavity 330 within body 320 includes mating features 332 for receiving mating features at a protrusion of a cryogenic-assisted adhesive removal tool. Passages 334 extend from cavity 330, forming a manifold 336 that leads to ports 340 for dispensing cryogenic fluid. Ports 340 therefore allow cryogenic fluid to be dispensed onto a surface, while passages 334 provide cooling for surface 310. Edge 312 of first interchangeable tip 300 may be manually moved across an adhesive feature to cleave the adhesive feature, or edge 312 may be mechanically driven to oscillate or rotate at a desired rate to facilitate cleaving. In this embodiment, the first interchangeable tip has an edge 312 with a length (L) of one quarter of an inch. In some embodiments, to enhance efficiency, the ports 340, from which cryogenic jets are dispensed to impinge upon a work surface as close as possible to the edge 312. In still further embodiments, the angle of the passages 334 and/or ports 340 is oriented to project cryogenic fluid towards edge 312 or a point at a surface contacted by edge 312 (or as close as is possible). Edge 312 may then be oscillated (e.g., manually) at a rate of multiple times per second while edge 312 and the underlying surface are cooled by the cryogenic fluid.

Figure 5:
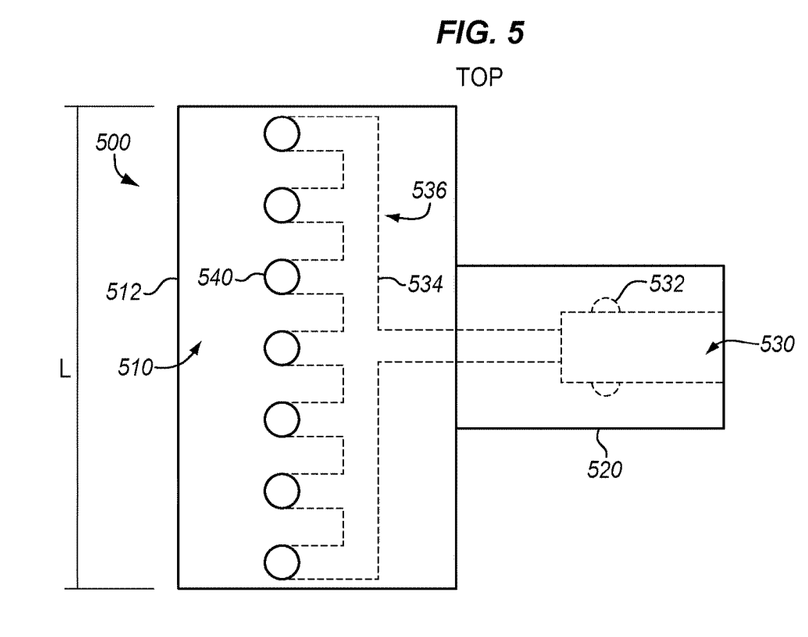
FIGS. 5-6 are views of a second interchangeable tip for a cryogenic-assisted adhesive removal tool in an illustrative embodiment.
Figure 6:
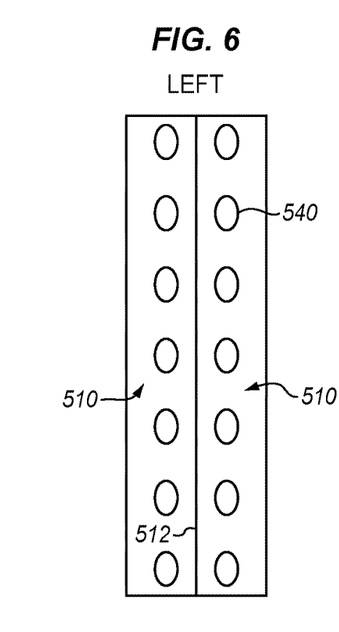

FIGS. 5-6 are views of a second interchangeable tip 500 for a cryogenic-assisted adhesive removal tool in an illustrative embodiment, and correspond with the views depicted in FIGS. 3 and 4. In this embodiment, second interchangeable tip 500 includes body 520, from which cleaving surface 510 extends, ending in edge 512. A cavity 530 within body 520 includes mating features 532 for receiving mating features at a protrusion of a cryogenic-assisted adhesive removal tool. Passages 534 extend from cavity 530, forming a manifold 536 that leads to ports 540 for dispensing cryogenic fluid. Ports 540 allow cryogenic fluid to be dispensed onto a surface, while passages 534 provide cooling for surface 310. Passages 534 therefore operate as a type of manifold. Edge 512 of second interchangeable tip 500 may be manually moved across an adhesive feature to cleave the adhesive feature, or edge 512 may be mechanically driven to facilitate cleaving. In this embodiment, the second interchangeable tip 500 has an edge 512 with a length (L) of several inches. However, in further embodiments the second interchangeable tip 500 has longer lengths, such as lengths of several feet.

Figure 7:
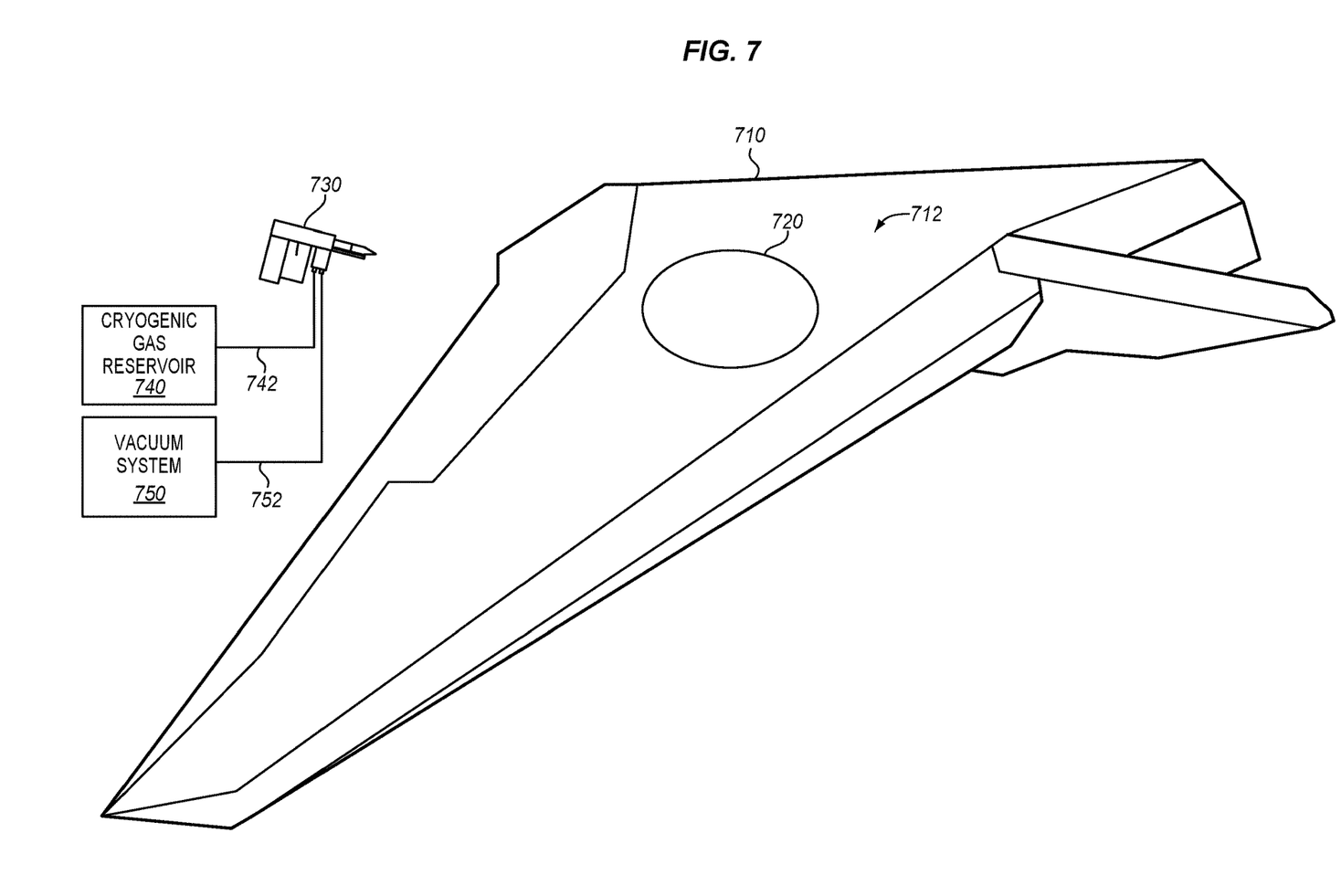
FIGS. 7-9 illustrate operation of a cryogenic-assisted adhesive removal tool to remove an adhesive feature in an illustrative embodiment.
Figure 8:
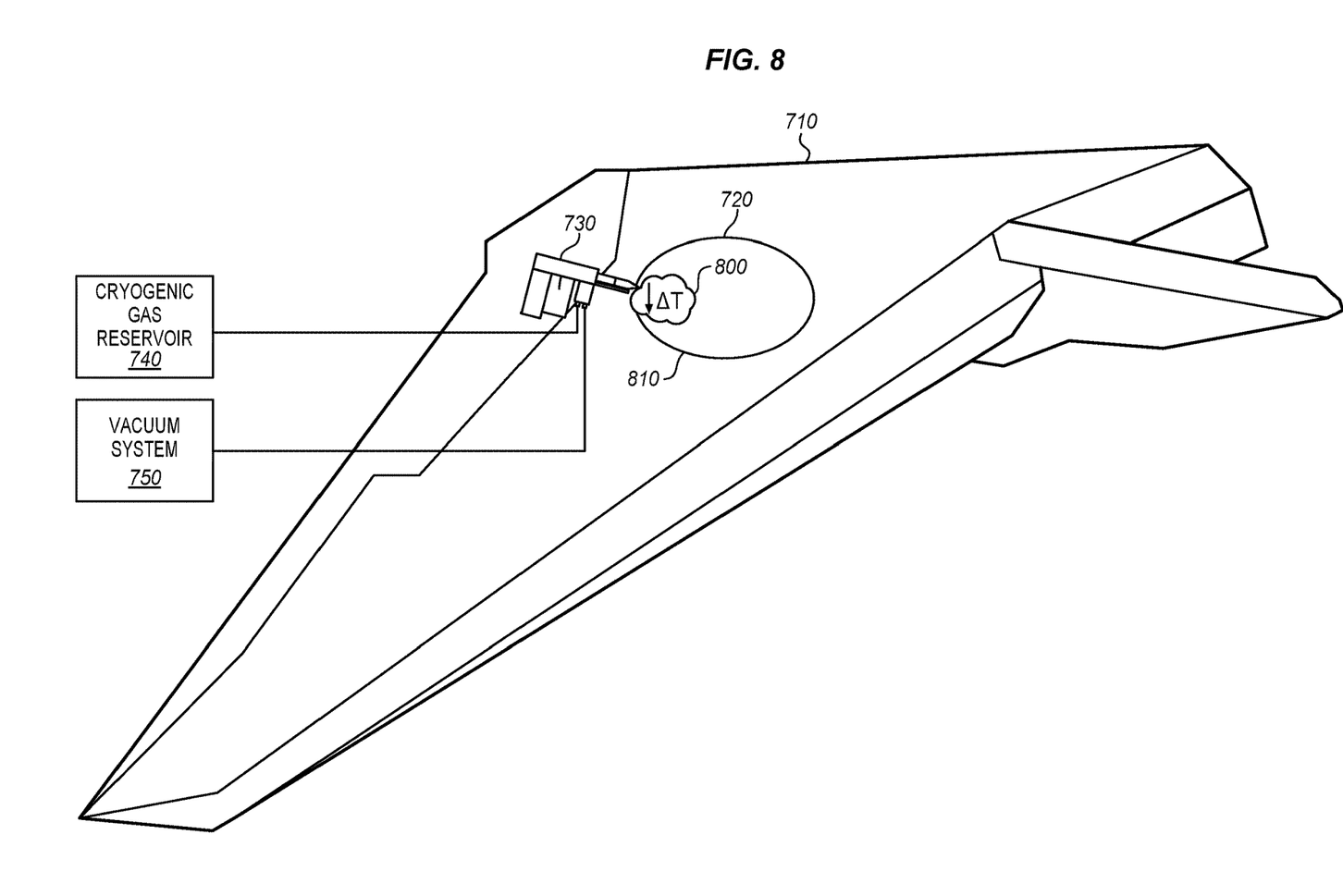
Figure 9:
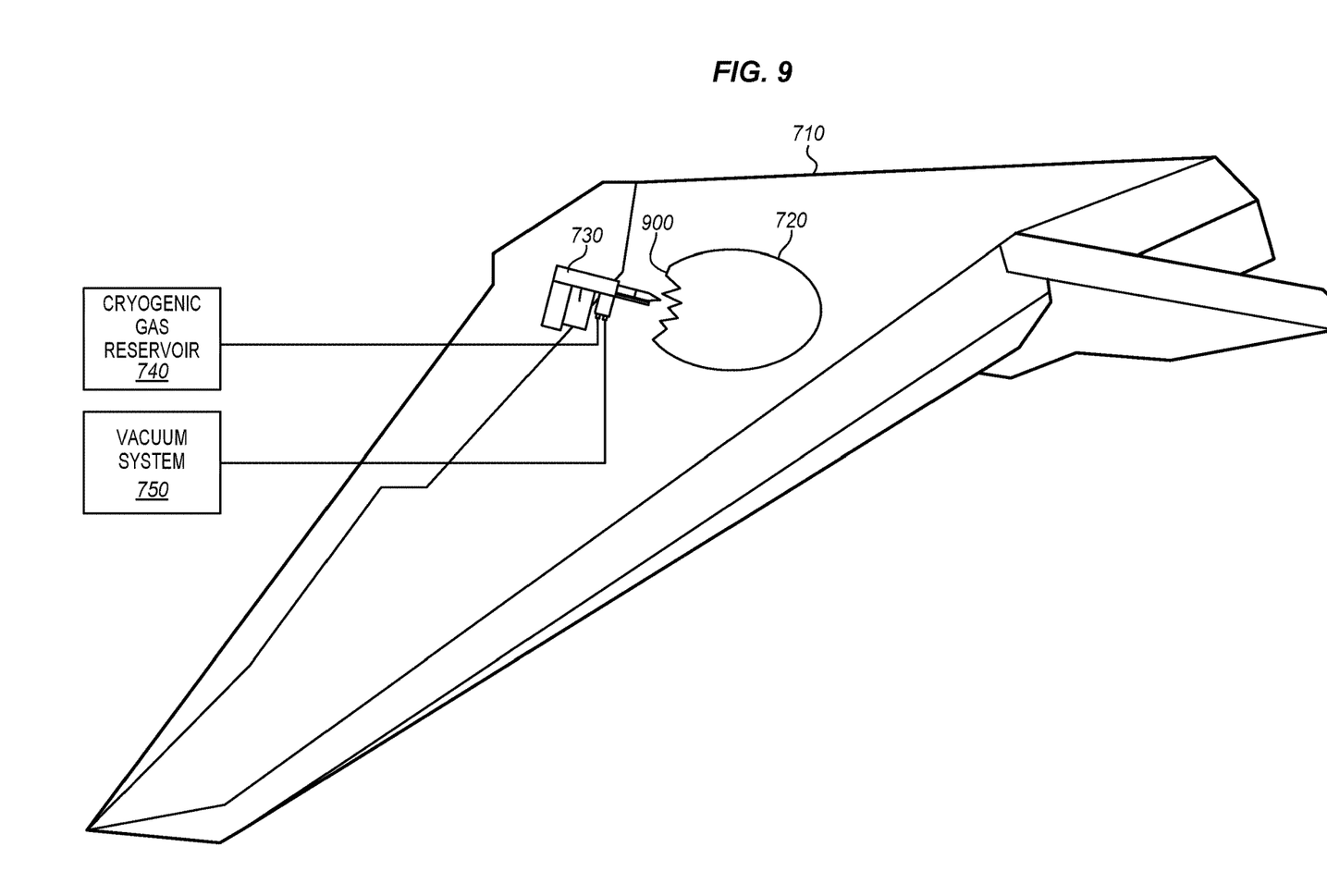

FIGS. 7-9 illustrate operation of a cryogenic-assisted adhesive removal tool 730 to remove an adhesive feature in an illustrative embodiment. As shown in FIG. 7, cryogenic-assisted adhesive removal tool 730 is coupled with a cryogenic gas reservoir 740 via dispensing pathway 742, and is coupled with a vacuum system 750 via a vacuum pathway 752. Cryogenic-assisted adhesive removal tool 730 will be used to remove an adhesive feature 720 (e.g., a decal) from surface 712 of a structure comprising a wing 710 of an aircraft.

In FIG. 8, the cryogenic-assisted adhesive removal tool 730 is disposed over a portion 810 of the adhesive feature 720, and a trigger of the cryogenic-assisted adhesive removal tool is actuated to dispense cryogenic fluid 800 in the form of carbon dioxide gas that has been cooled to negative fifty degrees Celsius (carbon dioxide sublimates from a solid to gas at negative fifty six degrees Celsius at atmospheric pressure, and liquefies at five point one atmospheres in certain temperature ranges). The cryogenic fluid 800 rapidly reduces a temperature of the portion 810 of the adhesive feature 720 to cool the adhesive feature or a chemical (e.g., an epoxy, glue, or resin) that bonds the adhesive feature to surface 712, as shown by the indicator ΔT. The cooling results in a physical change that causes the adhesive feature or the chemical to become more brittle. This circumvents the ability of the adhesive feature to remain elastomeric and capable of deformation, and hence facilitates cleaving of the adhesive feature from the underlying surface. The material can be chipped or shattered, enabling it to be decoupled from the underlying surface.

In FIG. 9, the cryogenic-assisted adhesive removal tool 730 is operated to cleave away the portion 810 of the adhesive feature 720, leaving a segment 900 behind. The cryogenic-assisted adhesive removal tool 730 may be operated again as shown in FIGS. 7-8 to dispense cryogenic fluid onto remaining portions of adhesive feature 720 and cleave them away. This process may be repeated until adhesive feature 720 has been completely removed.

Figure 10:
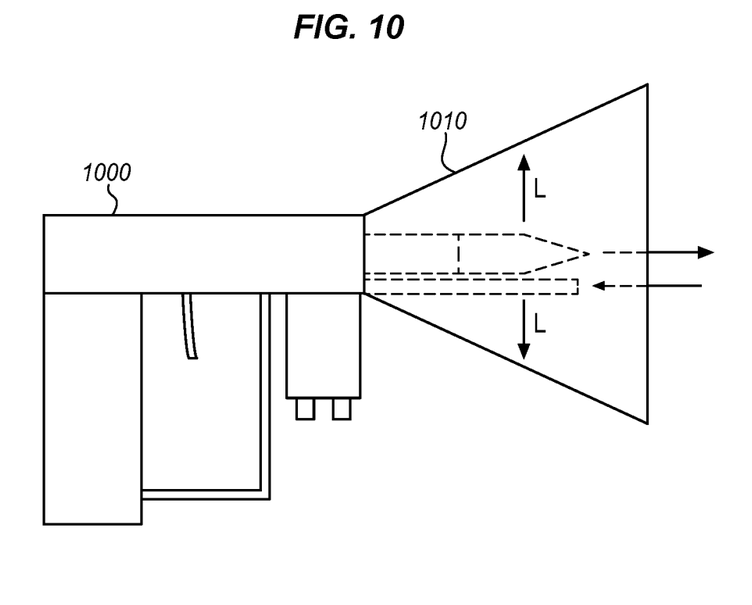
FIG. 10 illustrates a cryogenic-assisted adhesive removal tool with a shroud in an illustrative embodiment.

FIG. 10 illustrates a cryogenic-assisted adhesive removal tool 1000 with a shroud 1010 in an illustrative embodiment. Shroud 1010 is transparent, and reduces the likelihood that cryogenic fluid exiting the tool will travel towards a user of the apparatus, while also enabling an operator to view a work location. That is, cryogenic fluid exiting the cryogenic-assisted adhesive removal tool 1000 is physically blocked from freely traveling more than a certain distance laterally (L, of FIG. 10) when it is ejected out of cryogenic-assisted adhesive removal tool 1000, and therefore must proceed within the bounds of shroud 1010. This enhances the safety of an operator of the cryogenic-assisted adhesive removal tool 1000, by preventing cryogenic fluid from moving towards portions of cryogenic-assisted adhesive removal tool 1000 that are held by the operator. In other words, the jets of cryogenic fluid that impinge upon the surface that ricochet off the surface are deflected off of the shroud 1010, and remain safely apart from the operator.

Figure 11:
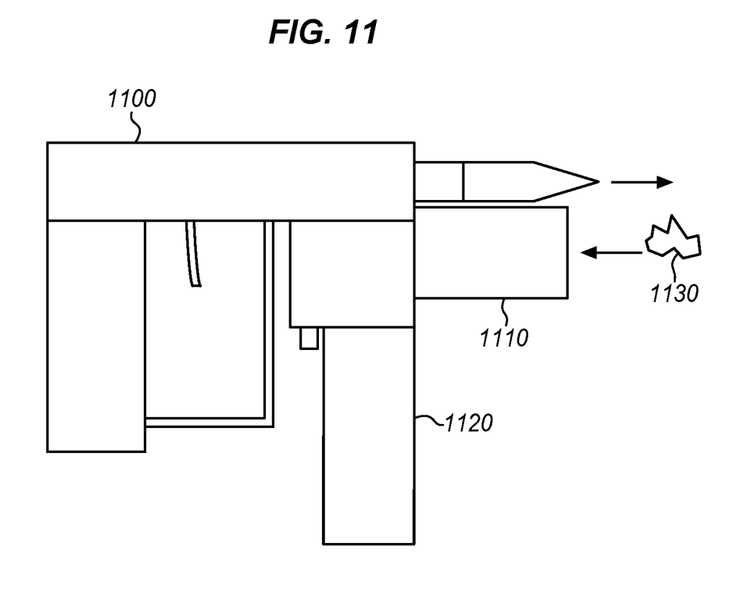
FIG. 11 illustrates a cryogenic-assisted adhesive removal tool with a debris vacuum port in an illustrative embodiment.

FIG. 11 illustrates a cryogenic-assisted adhesive removal tool 1100 with a debris vacuum port 1110 in an illustrative embodiment. Debris vacuum port 1110 leads to a vacuum pathway 1120 having a large-diameter, such as a vacuum pathway having a diameter of one to several inches. The increased size of the vacuum pathway 1120 enables debris 1130 generated as part of the cleaving process to be quickly and efficiently removed from the work area in which cryogenic-assisted adhesive removal tool 1100 is used.

EXAMPLES

In the following examples, additional processes, systems, and methods are described in the context of tools that utilize cryogenic fluid to facilitate cleaving of an adhesive feature from an underlying surface.

Figure 12:
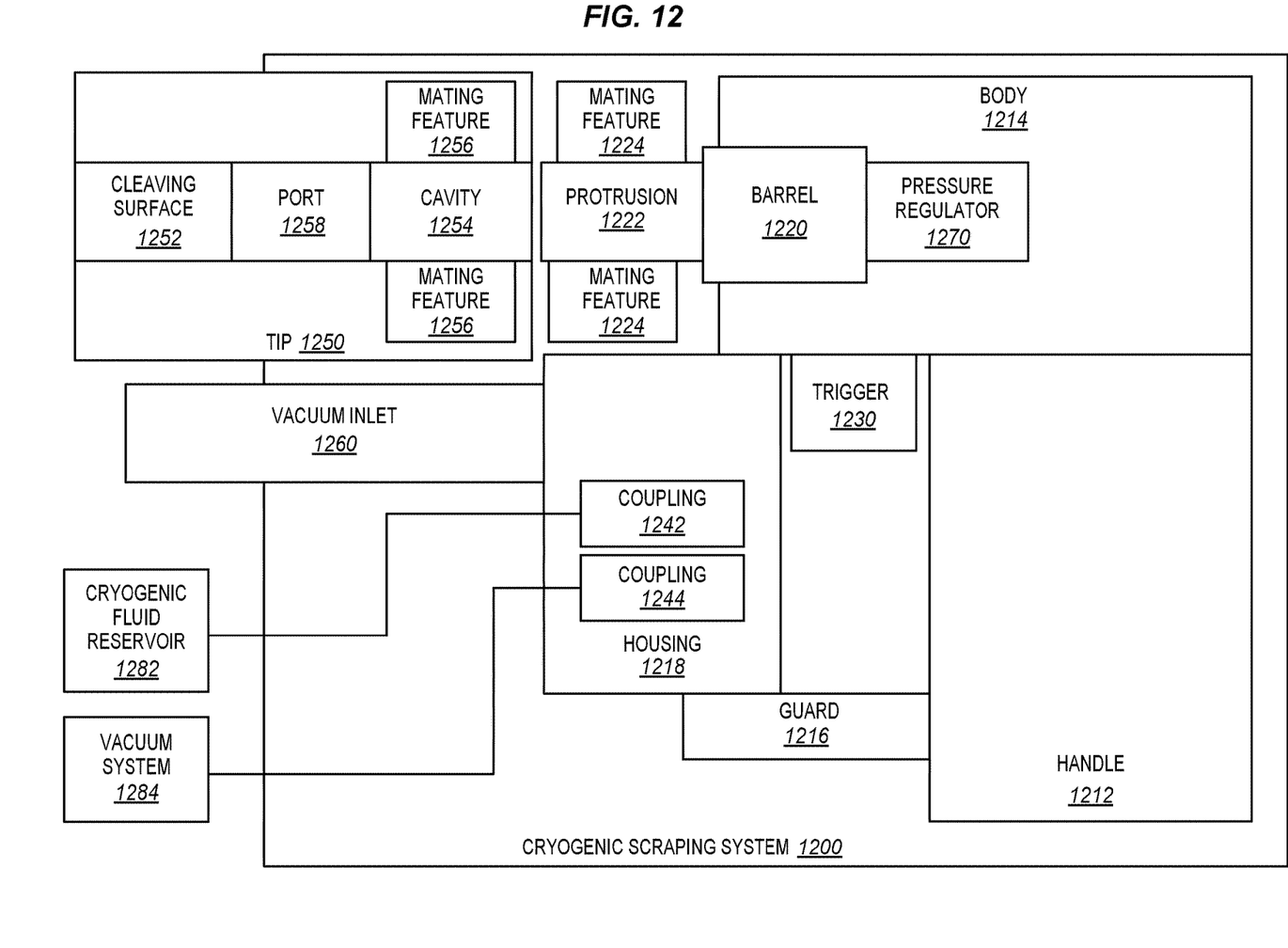
FIG. 12 is a block diagram of a cryogenic cleaving system in an illustrative embodiment.

FIG. 12 is a block diagram of a cryogenic cleaving system 1200 in an illustrative embodiment. Cryogenic cleaving system 1200 is provided in the form of a tool which is coupled with a cryogenic fluid reservoir 1282 and a vacuum system 1284. In this embodiment, cryogenic cleaving system 1200 includes handle 1212, which is physically integral with body 1214, guard 1216, and housing 1218. Housing 1218 includes coupling 1242 and coupling 1244, which enable the passage of fluid (e.g., liquid or gas) for cryogenic fluid reservoir 1282 and vacuum system 1284, respectively. Body 1214 includes pressure regulator 1270, which enables an adjustment of pressure and/or flow rate for the cryogenic fluid that will be dispensed. Barrel 1220 and protrusion 1222 mate with cavity 1254 of tip 1250, via interactions between mating features 1224, which physically mate with corresponding mating features 1256. Port 1258 communicates with cavity 1254, and cleaving surface 1252 is utilized to apply physical forces that remove adhesive features. Vacuum inlet 1260 extracts applied cryogenic fluid from near tip 1250, preventing build-up of the cryogenic fluid. In some embodiments, vacuum inlet 1260 also extracts fragments of the adhesive/sealant that have been cleaved or chipped away. Thus, as depicted in FIG. 12, cryogenic jets are manifolded through the cryogenic cleaving system and impinged upon a work area to make any flexible materials thereon brittle and chippable/cleavable.

Figure 13:
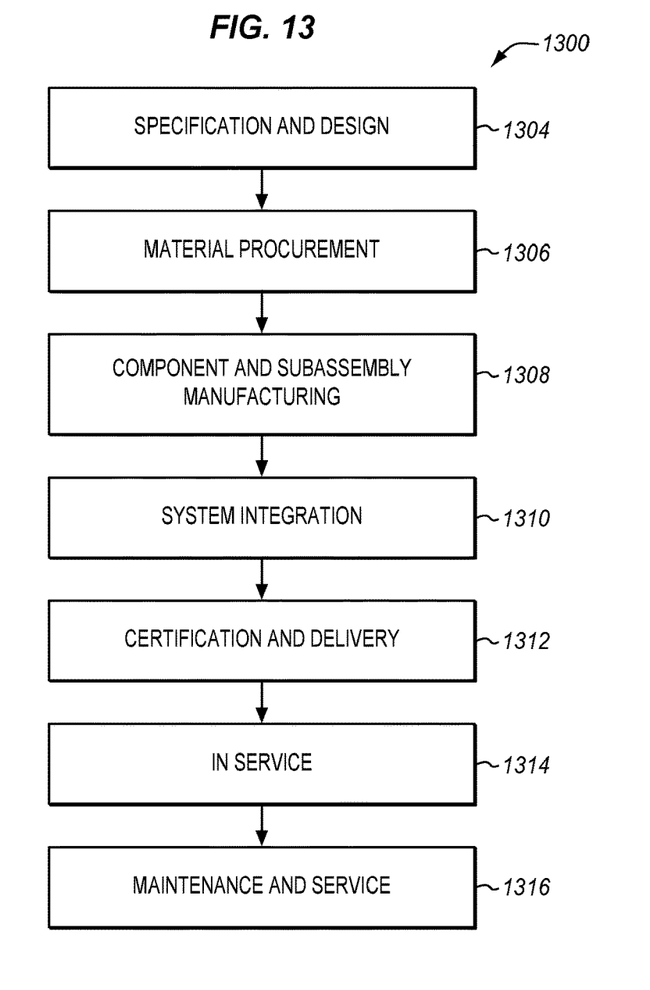
FIG. 13 is a flow diagram of aircraft production and service methodology in an illustrative embodiment.
Figure 14:
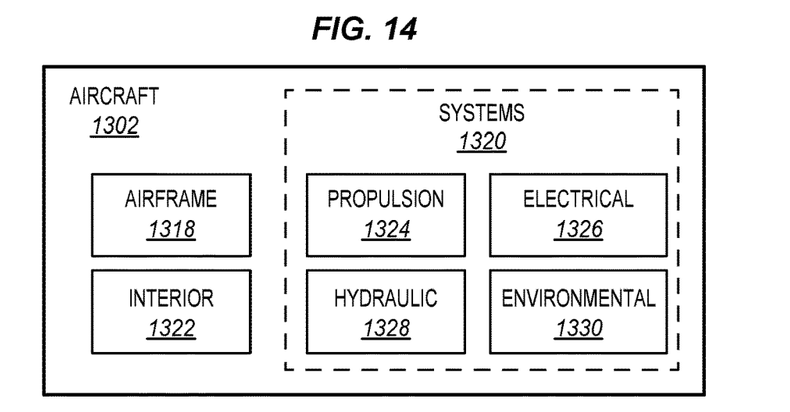
FIG. 14 is a block diagram of an aircraft in an illustrative embodiment.

Referring more particularly to the drawings, embodiments of the disclosure may be described in the context of aircraft manufacturing and service in method 1300 as shown in FIG. 13 and an aircraft 1302 as shown in FIG. 14. During pre-production, method 1300 may include specification and design 1304 of the aircraft 1302 and material procurement 1306. During production, component and subassembly manufacturing 1308 and system integration 1310 of the aircraft 1302 takes place. Thereafter, the aircraft 1302 may go through certification and delivery 1312 in order to be placed in service 1314. While in service by a customer, the aircraft 1302 is scheduled for routine work in maintenance and service 1316 (which may also include modification, reconfiguration, refurbishment, and so on). Apparatus and methods embodied herein may be employed during any one or more suitable stages of the production and service described in method 1300 (e.g., specification and design 1304, material procurement 1306, component and subassembly manufacturing 1308, system integration 1310, certification and delivery 1312, service 1314, maintenance and service 1316) and/or any suitable component of aircraft 1302 (e.g., airframe 1318, systems 1320, interior 1322, propulsion system 1324, electrical system 1326, hydraulic system 1328, environmental 1330).

Each of the processes of method 1300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 1302 produced by method 1300 may include an airframe 1318 with a plurality of systems 1320 and an interior 1322. Examples of systems 1320 include one or more of a propulsion system 1324, an electrical system 1326, a hydraulic system 1328, and an environmental system 1330. Any number of other systems may be included. Although an aerospace example is shown, the principles of the invention may be applied to other industries, such as the automotive industry or construction industry.

As already mentioned above, apparatus and methods embodied herein may be employed during any one or more of the stages of the production and service described in method 1300. For example, components or subassemblies corresponding to component and subassembly manufacturing 1308 may be fabricated or manufactured in a manner similar to components or subassemblies produced while the aircraft 1302 is in service. Also, one or more apparatus embodiments, method embodiments, or a combination thereof may be utilized during the subassembly manufacturing 1308 and system integration 1310, for example, by substantially expediting assembly of or reducing the cost of an aircraft 1302. Similarly, one or more of apparatus embodiments, method embodiments, or a combination thereof may be utilized while the aircraft 1302 is in service, for example and without limitation during the maintenance and service 1316. For example, the techniques and systems described herein may be used for material procurement 1306, component and subassembly manufacturing 1308, system integration 1310, service 1314, and/or maintenance and service 1316, and/or may be used for airframe 1318 and/or interior 1322. These techniques and systems may even be utilized for systems 1320, including, for example, propulsion system 1324, electrical system 1326, hydraulic 1328, and/or environmental system 1330.

In one embodiment, a part comprises a portion of airframe 1318, and is manufactured during component and subassembly manufacturing 1308. The part may then be assembled into an aircraft in system integration 1310, and then be utilized in service 1314 until wear renders the part unusable. Then, in maintenance and service 1316, the part may be discarded and replaced with a newly manufactured part. Inventive components and methods may be utilized throughout component and subassembly manufacturing 1308 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for operating a cryogenic-assisted adhesive removal tool, the method comprising:
   dispensing a cryogenic fluid onto an adhesive feature disposed at a surface of a structure;
   cooling the adhesive feature to cause a physical change making the adhesive feature brittle; and
   operating the cryogenic-assisted adhesive removal tool to cleave the adhesive feature from the surface while the adhesive feature is physically changed, wherein dispensing the cryogenic fluid and operating the cryogenic-assisted adhesive removal tool to cleave the adhesive feature are performed via a same tip of the cryogenic-assisted adhesive removal tool.

2. The method of claim 1 further comprising:
   removing the tip of the cryogenic-assisted adhesive removal tool.

3. The method of claim 1 wherein:
   the cryogenic fluid is dispensed from the cryogenic-assisted adhesive removal tool.

4. The method of claim 1 wherein:
   operating the cryogenic-assisted adhesive removal tool to cleave the adhesive feature is performed while the adhesive feature is below a glass transition temperature.

5. The method of claim 1 wherein:
   dispensing the cryogenic fluid comprises spraying cryogenic fluid that has been routed internally through the tip of the cryogenic-assisted adhesive removal tool.

6. The method of claim 1 wherein:
   dispensing the cryogenic fluid comprises dispensing a liquid.

7. The method of claim 1 further comprising:
   extracting applied cryogenic fluid from the surface, wherein the extracting is performed via the cryogenic-assisted adhesive removal tool.

8. The method of claim 1 further comprising:
   controlling a pressure at which the cryogenic fluid is applied.

9. The method of claim 1 wherein:
   the cryogenic fluid comprises a gas selected from the group consisting of carbon dioxide, nitrogen, helium, and argon.

10. The method of claim 1 wherein:
    operating the tool is performed without marking the surface.

11. The method of claim 1 wherein:
    operating the cryogenic-assisted adhesive removal tool comprises mechanically driving an edge of the tip of the cryogenic-assisted adhesive removal tool.

12. The method of claim 11 wherein:
    the mechanically driving comprises oscillating the edge.

13. The method of claim 11 wherein:
    the mechanically driving comprises rotating the edge.

14. The method of claim 1 wherein:
    dispensing the cryogenic fluid is performed via multiple ports at the tip at once.

15. The method of claim 14 wherein:
    the debris comprises portions of the adhesive feature that have been cleaved from the surface.

16. The method of claim 1 further comprising:
    utilizing a shroud at the cryogenic-assisted adhesive removal tool, wherein the shroud deflects cryogenic fluid that ricochets off of the surface.

17. The method of claim 16 wherein:
    the shroud is disposed between an operator of the tool and the surface.

18. The method of claim 1 further comprising:
    vacuuming the surface via the cryogenic-assisted adhesive removal tool to remove debris.

19. The method of claim 1 wherein:
    dispensing the cryogenic fluid comprises routing the cryogenic fluid through passages at the tip.

20. The method of claim 1 wherein:
    dispensing the cryogenic fluid comprises dispensing a gas.

* * * * *